United States Patent [19]

Bolmgren et al.

[11] 4,438,441

[45] Mar. 20, 1984

[54] MOSAIC RECORDER WITH IMPROVED TRANSDUCER

[75] Inventors: Jan Bolmgren, Vaellingby; Kenth Nilsson, Akersberga, both of Sweden

[73] Assignee: Siemens Aktiengesellschaft, Berlin & Munich, Fed. Rep. of Germany

[21] Appl. No.: 361,986

[22] Filed: Mar. 25, 1982

[30] Foreign Application Priority Data

Apr. 8, 1981 [DE] Fed. Rep. of Germany ....... 3114224

[51] Int. Cl.[3] .............................................. G01D 15/18

[52] U.S. Cl. .................................. 346/140 R; 310/330

[58] Field of Search .................... 346/140 R; 310/330, 310/367, 365

[56] References Cited

U.S. PATENT DOCUMENTS 2,900,536 8/1959 Palo ................................ 310/367 X 4,072,959 2/1973 Elmquist ............................. 346/140

*Primary Examiner*—Joseph W. Hartary

*Attorney, Agent, or Firm*—Hill, Van Santen, Steadman & Simpson

[57] ABSTRACT

A mosaic recorder for selectively ejecting recording liquid droplets from a plurality of nozzles in a recording head onto a moving recording medium for punctiform representation of characters and images has a plurality of piezoelectric transducers respectively associated with each nozzle which are individually actuated for ejecting a droplet from the associated nozzle. The individual transducers are in the form of teeth of a comb-like bilaminar piezoplate consisting of piezoceramic material and a carrier material. The piezo material is removed from portions of the free ends of the transducer teeth which overlie the nozzles for reducing the hydraulic coupling between the teeth in order to substantially minimize cross-talk between an activated transducer tooth and the adjacent transducer teeth.

5 Claims, 5 Drawing Figures

MOSAIC RECORDER WITH IMPROVED TRANSDUCER

BACKGROUND OF THE INVENTION

1. Field of the Invention

The present invention relates to mosaic ink recorders, and in particular to a transducer structure for such a recorder.

2. Description of the Prior Art

Mosaic ink recorders are known, such as the recorder described in German OS No. 2,527,647, for ejecting recording liquid droplets from a plurality of nozzles in a recording head onto a moving recording medium for punctiform representation of alphanumeric characters and images wherein each nozzle has a piezoelectric transducer associated therewith which is in the form of a tooth of a comb-like piezoplate. The piezoelectric transducers have free ends which respectively overlay the recording head nozzles. The transducers are normally connected to a potential source of appropriate polarity and move to eject a liquid droplet from the associated nozzle upon interruption of the potential. The piezoplate of which the transducer teeth are a part is bilaminar and consists of a layer of piezoceramic material and a layer of carrier material.

Such conventional recorders exhibit the problem that, upon activation of an individual transducer tooth, cross-talk between the activated transducer tooth and adjacent transducer teeth may occur as a result of hydraulic coupling through the recording liquid. This coupling may cause an adjacent non-activated tooth to be set in motion and thus expel recording liquid from the nozzle associated therewith, thus causing an unwanted dot to be printed on the recording carrier.

A further problem resulting from hydraulic coupling which is present in conventional recorders, to which the problem of mechanical coupling between adjacent transducers also contributes, is the necessity of maintaining each transducer tooth prior to its activation in a rest or non-operating position in order to obtain a good recording quality. If two adjacently disposed transducer teeth are to be activated in direct succession, the first-activated tooth should not set the adjacent tooth in oscillation, even if the unwanted oscillation of the adjacent tooth does not cause recording liquid to be ejected. In conventional recorders, this problem is attempted to be solved by insuring that the time interval between successive activation pulses is sufficiently long so that the oscillation of a tooth adjacent to an activated tooth decays sufficiently before actuation of the adjacent tooth. The result is a significant reduction in the maximum recording speed. The oscillation of the adjacent tooth may also be effectively attenuated by utilizing a recording liquid of high viscosity, however, this solution increases the hydraulic coupling between the transducer teeth.

The oscillation speed of a transducer tooth is greatest at the tip of its free end, and therefore the hydraulic coupling between the teeth is also greatest in the region of the tips of the transducer teeth. Another possibility for reducing the hydraulic coupling between adjacent teeth is to increase the physical spacing between the transducer teeth. This attempted solution, however, reduces the recording quality because the distance between the nozzles associated with the transducer teeth must necessarily be increased as well.

SUMMARY OF THE INVENTION

It is an object of the present invention to provide a mosaic recorder having a plurality of nozzles disposed in rows in a recording head, each nozzle having a transducer associated therewith which is in the form of a tooth of a comb-like piezoplate wherein the hydraulic coupling between the transducer teeth is substantially reduced such that cross-talk between an activated transducer tooth and adjacent transducer teeth is largely eliminated.

The above object is inventively achieved in a mosaic recorder wherein the piezoceramic layer of the bilaminar piezoplate is removed from the carrier layer at the free end region of the transducer teeth.

According to Newton's Law (for Newton-liquids) the force F between two parallel planes having surfaces A which are displaced by an interval e relative to one another with a speed v is determined by the following equation:

$$F=\eta\cdot A\cdot v/e$$

The symbol $\eta$ designates the viscosity of the medium between the parallel planes, which in this case is the viscosity of the recording liquid. The force F is thus proportional to the speed difference v and the surface area A. As stated above, the speed of an activated transducer tooth is greatest at the free end region and the coupling force between the activated tooth and adjacent transducer teeth is therefore greatest at this end region. In the transducer structure disclosed and claimed herein, the transducer teeth are comparatively thin (surface A is very small) at the end region because of the removal of piezoelectric material at this portion of the transducer, so that the hydraulic coupling and hence the cross-talk between transducer teeth is substantially avoided.

A further advantage of the structure disclosed and claimed herein is that the resonant frequency of the transducer teeth increases, permitting a higher recording speed. A further advantage of the transducer structure wherein the transducer tip has no piezoelectric layer is that the impact of the transducer tooth striking against the recording head during its oscillation is substantially absorbed by the carrier layer of the transducer, which is preferably a metal layer, and thus the more fragile piezoceramic material of the transducer tooth is subjected to substantially less stress than in conventional structures thereby increasing the life of the recorder.

In a preferred embodiment of the invention, the portion of the transducer tooth having no piezoceramic material amounts to a fraction of the total transducer tooth length in the range of 1/5 to $\frac{1}{2}$, preferably $\frac{1}{3}$ of the transducer length. The length of the metal carrier layer is also selected such that the resonant frequency of the tip of the transducer tooth is above the resonant frequency of the entire tooth, including the non-ceramic portion. In certain applications, such as for example when a recording liquid with a low viscosity is utilized, the resonant frequency of the transducer tip may be made lower than that of the bilaminar portion. The tip then functions as an oscillator which can be set in motion by the bilaminar portion of the transducer tooth.

DESCRIPTION OF THE PREFERRED EMBODIMENTS

Figure 2:
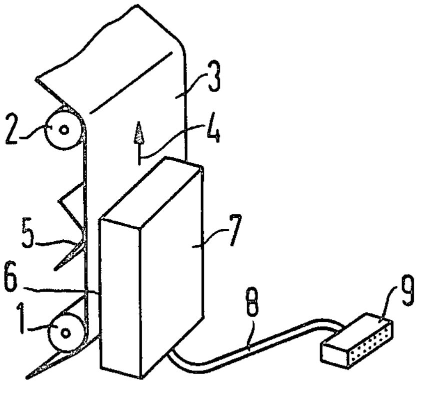
FIG. 2 is a perspective view of the basic elements of a mosaic recorder of the type in which the transducer structure disclosed and claimed herein may be utilized.

The basic elements of a conventional mosaic recorder of the type in which the transducer structure disclosed herein may be utilized are shown in FIG. 2. A recording medium 3, such as paper, is moved by transport rollers 1 and 2 driven by a suitable drive means (not shown) over a spacer 5 in the direction of the arrow 4. The recording medium 3 moves substantially parallel to and slightly spaced from a side 6 of a recording head mounted in a housing 7. The recording head in the housing 7 is connected via an input/output line 8 to a connector 9 which is in turn plugged into a suitable control apparatus (not shown) for causing droplets of recording liquid, such as ink, to be ejected from selected nozzles in the recording head for printing alphanumeric characters and images on the recording medium 3 in punctiform representation.

Figure 3:
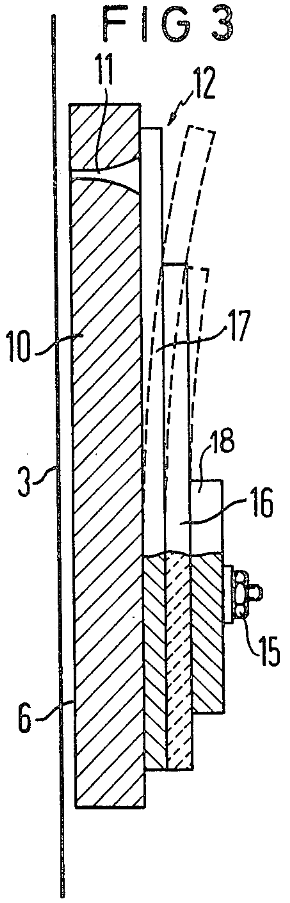
FIG. 3 is a sectional view taken along line III—III of FIG. 1 further showing the juxtaposition of the recording head with a recording medium.
Figure 1:
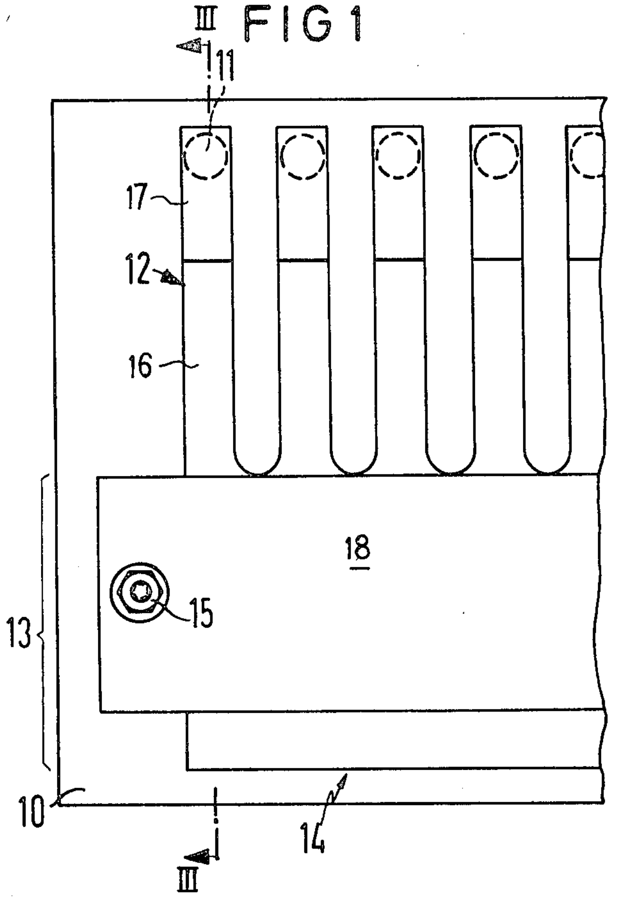
FIG. 1 is a plan view of a comb-like piezoplate for a mosaic ink recorder constructed in accordance with the principles of the present invention.

The details of the recording head relating to the subject matter disclosed and claimed herein are shown in FIGS. 1 and 3. The recording head 10 has a plurality of nozzles 11 disposed in rows. Each nozzle 11 has an exit opening on the side 6 of the recording head 10 from which recording liquid is expelled and an inlet opening which is covered by an associated transducer 12. The transducers 12 are in the form of teeth of a comb-like piezoplate 14 which is mounted parallel to the recording head 10 by a retainer plate 18 and a suitable fastening means such as a bolt 15.

The piezoplate 14 is bilaminar and consists of a carrier layer 17 immediately adjacent to the recording head 10, which may be comprised of metal, and a piezoelectric layer 16, which may be ceramic. Each transducer 12 is normally supplied with a potential of suitable polarity causing the transducer 12 to assume a non-operational position indicated by the dashed lines in FIG. 3. Upon the occurrence of a brief interruption in the potential for a particular transducer, the transducer 12 assumes the position shown in the solid lines in FIG. 3, thereby causing a droplet of recording liquid to be ejected from the associated nozzle 11.

In accordance with the principles of the present invention the free end of each transducer 12 which overlies the nozzle 11 has no piezoelectric layer, the piezoelectric layer 16 terminating a distance from the tip of the transducer 12. The fraction of the transducer tooth 12 having no piezoceramic material is a fraction of the total length of the transducer tooth 12 in the range of 1/5 to $\frac{1}{2}$, and is preferably $\frac{1}{3}$ of the overall length of the transducer tooth 12.

Figure 4:
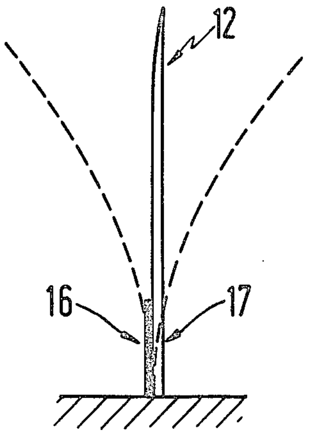
FIG. 4 is a simplified side view of a piezoelectric transducer constructed in accordance with the principles of the present invention operating as a flexural oscillator in a second embodiment.

Moreover, the length of the metal exposed tip of the transducer 12 is selected such that its resonant frequency is well above the resonant frequency of the entire transducer tooth, including the exposed tip. In certain applications, such as those applications wherein a recording liquid with a low viscosity is used, the resonant frequency of a comparatively long exposed metal tip can be made low in comparison with the resonant frequency of the bilaminar portion. The transducer tooth 12 then functions as an oscillator which is set in motion by the bilaminar portion, as shown in FIG. 4. As further shown in FIG. 4, the metal layer 17, after removal of the piezoelectric layer at the end region, may be ground to a point to further reduce hydraulic coupling.

Figure 5:
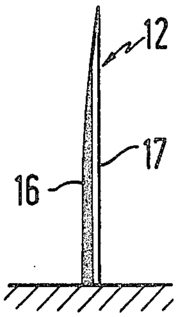
FIG. 5 is a simplified lateral view of a further embodiment of the piezoelectric transducer disclosed and claimed herein.

Another embodiment of a transducer tooth embodying the inventive concept disclosed herein is shown in FIG. 5 wherein a portion of the remaining piezoelectric layer 16 has also been ground so as to begin tapering the tip of the transducer 12 before the exposed metal layer 17. This structure further reduces the hydraulic coupling between adjacent transducer teeth 12 thus further eliminating cross-talk between an activated transducer tooth and adjacent teeth so that a good recording quality and a high recording speed can be obtained.

As stated above, the material for the carrier layer 17 may be metal, and the material for the piezoelectric layer may be glass, ceramic or aluminum oxide.

Although modifications and changes may be suggested by those skilled in the art it is the intention of the inventors to embody within the patent warranted hereon all changes and modifications as reasonably and properly come within the scope of their contribution to the art.

We claim as our invention:

1. In a mosaic recorder having a recording head with a plurality of nozzles disposed in rows for ejecting droplets of recording liquid for printing alphanumeric characters and images in punctiform representation, each nozzle having a piezoelectric transducer associated therewith having a movable free end for forcing said recording liquid through said nozzles upon selected activation of said transducers, the improvement comprising a bilaminar comb-like piezoplate having a plurality of teeth forming said transducers, said plate having a carrier layer adjacent to said recording head and a piezoceramic layer, said piezoceramic layer for each of said transducer teeth terminating a distance from said free end of said transducer such that a fraction of said transducers respectively overlying said nozzles consists solely of exposed carrier layer, said fraction of said transducers being lighter and thinner than a remainder of said piezoplate.

2. The improvement of claim 1 wherein said fraction is in the range of 1/5 to $\frac{1}{2}$.

3. The improvement of claim 2 wherein said fraction is $\frac{1}{3}$.

4. The improvement of claim 1 wherein said exposed carrier layer and a portion of said piezoceramic layer for each transducer is ground such that said transducer tapers to a thinnest point at said free end thereof.

5. The improvement of claim 1 wherein said exposed carrier layer is ground such that said transducer tapers to a thinnest point at said free end thereof.

* * * * *